UNITED STATES PATENT OFFICE.

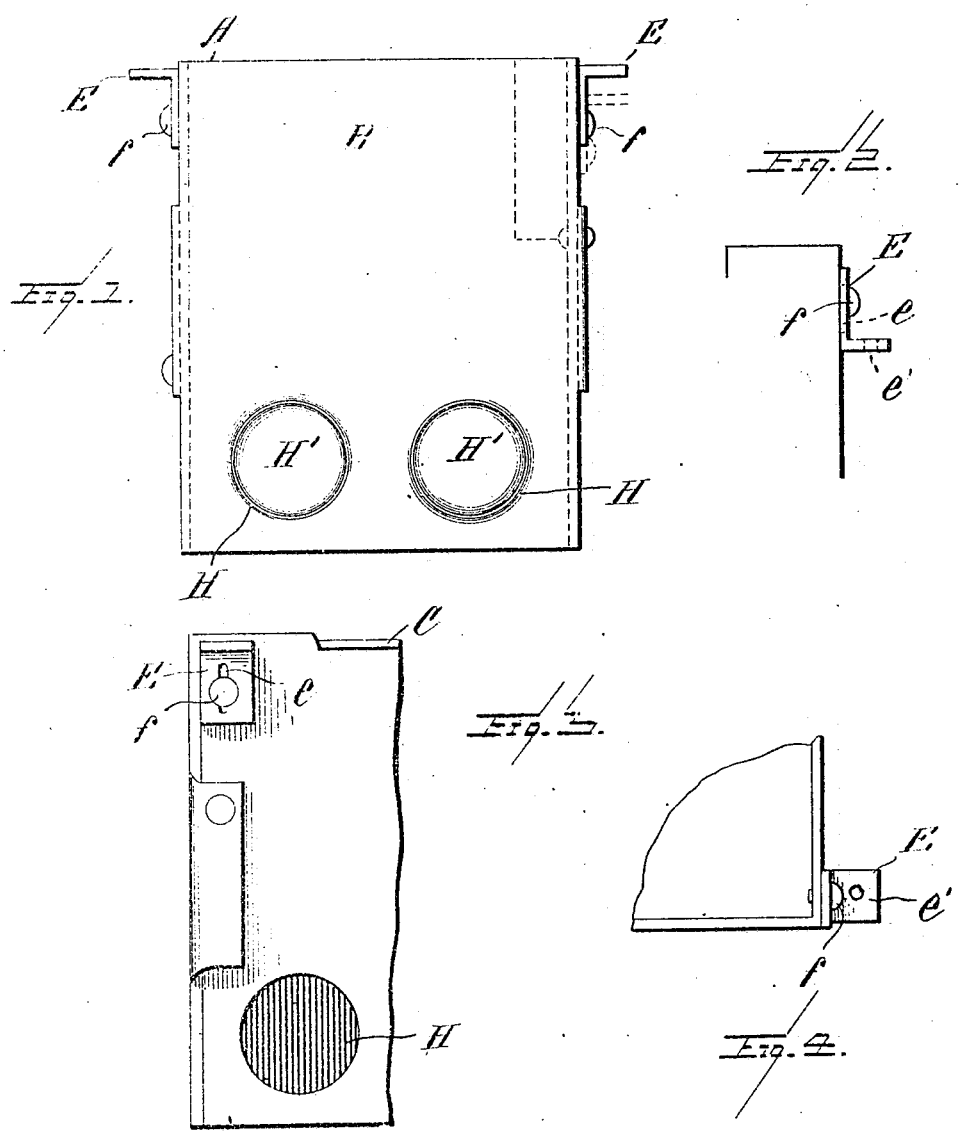

ALBERT I. APPLETON, OF CHICAGO, ILLINOIS, AND OTTO C. HOFFMANN, OF BUFFALO, NEW YORK, ASSIGNORS TO CHICAGO FUSE WIRE & MANUFACTURING COMPANY, OF CHICAGO, ILLINOIS.

OUTLET-BOX.

950,502.      Specification of Letters Patent.      Patented Mar. 1, 1910.

Application filed November 29, 1905. Serial No. 289,582.

*To all whom it may concern:*

Be it known that we, ALBERT I. APPLETON and OTTO C. HOFFMANN, citizens of the United States, residing at Chicago and Buffalo, in the counties of Cook and Erie and States of Illinois and New York, have invented new and useful Improvements in Outlet-Boxes, of which the following is a specification.

This invention relates to junction boxes of the type now in common use in equipping a building with an electric lighting system, as for instance, those adapted to be mounted in the wall of a room and to receive and support switches, fuses, wire joints, etc.

The object of the invention is to improve the construction of such boxes with respect to the means whereby they are secured to the supporting structure.

In installing junction boxes of this character, the forward edge should be approximately in the same plane or bear some depth relation to the surface of the plaster. However, the plaster itself affords an insecure support for the box, and if nails or screws were driven into or through the plaster and into the lathing or other woodwork, the plaster would probably be cracked or broken away adjacent to the opening for the box. We therefore provide means for securing the box directly to the woodwork and since different conditions prevail in each installation with respect to the thickness of the plaster and the arrangement of the woodwork, we make this securing means adjustable relatively to the box itself. For this purpose we employ a pair of ears or brackets of peculiar shape such that they can be secured to the box in various positions, affording a wide range of adjustment and when the proper positions have been found and the brackets secured to the box, the brackets may be fastened to the woodwork in a manner best suited to the support of the box. It is further understood that these boxes are almost wholly used in flush work, where the box itself is embedded in the wall of the building, and they either come to the surface or approach the surface more or less closely. It is to this end that we have devised adjustable ears or box supports, which may have a slotted attachment to the box itself. This affords a certain amount of adjustment which is doubled or trebled by the fact that these ears are also reversible, with reference to the box. One method of securing this double adjustment is described herein. By this means a great variety of wall parts or parts of the wall-structure are available for the support of the box in any of its required positions or any of its required depths.

Figure 1, is a side elevation of a unit showing the ear in two of its positions. Fig. 2, is a detail showing the ear reversed. Fig. 3, is an elevation taken at 90° from that of Fig. 2: Fig. 4, is a view of the ear reversed on the box.

Referring to the drawings, the box is of rectangular form and of such size and shape as is best adapted for the use to which it is to be put. It is preferably formed of one or more sheet metal blanks which are cut to the desired shape and bent to form the walls of the box A. At the upper edge, ears C may be provided integral with the side walls and bent so that their upper faces lie approximately in the plane of the top of the box; these ears may have threaded openings therethrough by which the cover plate may be secured thereto. The walls of the box have openings H therethrough for entrance of the electric conductors and plugs H' for the unused openings.

Adjustably secured to each of two opposite sides of the box is a bracket E having a body portion and a flange turned at substantially a right angle to the body. In the body is a long slot e extending lengthwise thereof and a screw f is adapted to extend through this slot and into a threaded opening in the wall of the box and thus secure the bracket to the box in the positions illustrated in Fig. 1 (see dotted lines) or in that of Fig. 2, or in any position intermediate of those two, or at an angle. The box may also be supplied with the usual switch supporting ears. Our invention applies to any form of switch box.

In installing the box, an opening is made in the wall of sufficient size for the box to be inserted therein and at the sides thereof the plaster is cut away to expose the lathing or other woodwork for a distance equal to the width of the box A. The operator then determines the position of the brackets E relative to the box which is necessary to support the box in the proper position. This can be conveniently done by loosening screw

*f* holding the ears, inserting the box in the opening and pressing the ears back until in position. The box is then withdrawn and the screws *f* tightened up to hold the ears in the positions thus found and the box is reinserted in the opening and nails or screws inserted through the holes *e'* into the woodwork to hold the box in position. The slots *e* are of considerable length and considerable adjustment is thereby afforded as to position, sufficient to provide for the varying thicknesses of plastering. If this is not sufficient, however, an increased range can be obtained by loosening the screws *f* removing the brackets E and reversing same, as illustrated in Fig. 4. In this way, the brackets can be secured to the box either way, thus giving two adjustments additional to those afforded by slots *e*.
By this construction, the securing devices for the box are applied directly to the woodwork so that breaking of the plastering about the opening for the box is avoided and the boxes can be rigidly and permanently secured in the desired position, as for instance, that in which the top of the box lies in the plane of the surface of the plastering, even though the thickness of the plastering varies to a considerable extent. Furthermore, in cases where it is necessary to cut away woodwork to receive the securing means for a box, the depth of these cuts does not have to be accurately gaged as the adjustment of the ears will compensate for any inaccuracies.

Having described our invention, what we claim as new and desire to secure by Letters Patent is:

1. A junction box having brackets at the sides thereof, said brackets having slots therein, and screws extending through said slots and entering threaded openings in the sides of the box, said brackets having outwardly extending portions formed to facilitate securing them to the woodwork of the supporting structure.

2. A junction box provided with brackets each having two integral portions one turned at an angle to the other, and means for securing either of the two portions of a bracket to a side wall of the box.

3. A junction box provided with brackets each having two integral portions one turned at an angle to the other and having a slot therein, and means adapted to co-act with said slots to adjustably secure the portions of said brackets having the slots therein to the side walls of the box or to secure the other portions of said brackets to the side walls of the box.

In testimony whereof we have hereunto set our hands in presence of two subscribing witnesses.

ALBERT I. APPLETON.
OTTO C. HOFFMANN.

Witnesses:
  W. W. MERRILL,
  R. D. DANA.